(12) United States Patent
Ma et al.

(10) Patent No.: US 11,108,502 B2
(45) Date of Patent: Aug. 31, 2021

(54) INFORMATION SENDING METHOD AND APPARATUS AND INFORMATION RECEIVING METHOD AND APPARATUS

(71) Applicant: Huawei Technologies Co., Ltd., Shenzhen (CN)

(72) Inventors: Ruixiang Ma, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 16/599,243

(22) Filed: Oct. 11, 2019

(65) Prior Publication Data
US 2020/0044779 A1  Feb. 6, 2020

Related U.S. Application Data

(63) Continuation of application No. PCT/CN2018/082865, filed on Apr. 12, 2018.

(30) Foreign Application Priority Data

Apr. 13, 2017  (CN) .......................... 201710241205.2

(51) Int. Cl.
H04W 72/12 (2009.01)
H04L 1/16 (2006.01)
H04W 72/04 (2009.01)

(52) U.S. Cl.
CPC ......... *H04L 1/1607* (2013.01); *H04W 72/042* (2013.01)

(58) Field of Classification Search
CPC ......... H04W 72/1263; H04W 72/1289; H04W 72/042; H04W 72/1205; H04W 72/0453;
(Continued)

(56) References Cited

U.S. PATENT DOCUMENTS 9,087,238 B2   7/2015  Gao et al.
9,497,750 B2  11/2016  Li et al.
(Continued)

FOREIGN PATENT DOCUMENTS

CN  101867882 A  10/2010
CN  101873609 A  10/2010
(Continued)

OTHER PUBLICATIONS

Huawei et al., "Demodulation RS design for DL control channel", 3GPP TSG RAN WG1 Meeting #87, R1-1611209, Nov. 14-18, 2016, 3 pages, Reno, USA.
(Continued)

*Primary Examiner* — Jung Liu
(74) *Attorney, Agent, or Firm* — Slater Matsil, LLP

(57) ABSTRACT

This application provides a feedback information sending method, including: receiving, by a terminal device, in a first time unit, a first reference signal sent by a network device, where the first reference signal corresponds to first downlink control information, and the first downlink control information is used to schedule a first information block; determining, by the terminal device based on the first reference signal, that receiving of the first downlink control information in the first time unit fails; and sending, by the terminal device, on a first resource corresponding to the first time unit, first feedback information to the network device, where the first feedback information indicates that the receiving of the first downlink control information fails.

18 Claims, 6 Drawing Sheets

(58) Field of Classification Search
CPC ... H04L 5/0044; H04L 5/0007; H04L 5/0094; H04L 5/00; H04L 5/001; H04L 27/2602; H04L 5/0053; H04B 7/0413; H04J 11/00
See application file for complete search history.

(56) References Cited

U.S. PATENT DOCUMENTS

| | | | |
|---|---|---|---|
| 9,872,123 | B2 | 1/2018 | Webb et al. |
| 2014/0293843 | A1 | 10/2014 | Papasakellariou et al. |
| 2014/0328293 | A1 | 11/2014 | Seo et al. |
| 2017/0230994 | A1* | 8/2017 | You ................. H04L 5/0053 |
| 2017/0367092 | A1 | 12/2017 | Kim et al. |
| 2018/0084559 | A1* | 3/2018 | Kim ................. H04W 72/042 |
| 2018/0317213 | A1* | 11/2018 | Islam ................. H04L 1/1822 |
| 2018/0324766 | A1 | 11/2018 | Qiu et al. |
| 2018/0332566 | A1 | 11/2018 | You et al. |
| 2018/0338318 | A1* | 11/2018 | Yum ................. H04W 72/1205 |

FOREIGN PATENT DOCUMENTS

| | | |
|---|---|---|
| CN | 102668415 A | 9/2012 |
| CN | 102843209 A | 12/2012 |
| CN | 104054378 A | 9/2014 |
| CN | 104756433 A | 7/2015 |
| CN | 105264995 A | 1/2016 |
| CN | 105429736 A | 3/2016 |
| CN | 105978671 A | 9/2016 |
| WO | 2016105132 A1 | 6/2016 |
| WO | 2017014549 A1 | 1/2017 |
| WO | 2017050996 A1 | 3/2017 |

OTHER PUBLICATIONS

LG Electronics, "Discussion on RRM measurement in NR", 3GPP TSG RAN WG1 NR Ad-Hoc Meeting, R1-1700466, Jan. 16-20, 2017, 5 pages, Spokane, USA.

Huawei et al., "Demodulation RS design for DL control channel", 3GPP TSG RAN WG1 Meeting #88bis, R1-1704201, Apr. 3-7, 2017, 5 pages, Spokane, USA.

Sony, "Intermediate feedbacks for improving URLLC latency and reliability", 3GPP TSG RAN WG1 Meeting #88bis, R1-1705213, Apr. 3-7, 2017, 4 pages, Spokane, WA, USA.

Mediatek Inc., "On diversity and HARQ support for URLLC", 3GPP TSG RAN WG1 Meeting # 88 R1-1702746, Feb. 17, 2017 (Feb. 17, 2017), total 6 pages.

* cited by examiner

INFORMATION SENDING METHOD AND APPARATUS AND INFORMATION RECEIVING METHOD AND APPARATUS

CROSS-REFERENCE TO RELATED APPLICATIONS

This application is a continuation of International Application No. PCT/CN2018/082865, filed on Apr. 12, 2018, which claims priority to Chinese Patent Application No. 201710241205.2, filed on Apr. 13, 2017. The disclosures of the aforementioned applications are hereby incorporated by reference in their entireties.

TECHNICAL FIELD

Embodiments of this application relate to the communication field, and more specifically, to a feedback information sending method and apparatus and a feedback information receiving method and apparatus.

BACKGROUND

Mobile communication technologies have profoundly changed people's life, and people's pursuit of a mobile communication technology with higher performance has never ceased. To cope with an explosive growth of mobile data traffic, massive device connections of mobile communication, and continuously emerging various new services and application scenarios in the future, a 5th generation (5G) mobile communication system accordingly emerges. The 5G mobile communication system needs to support an enhanced mobile broadband (eMBB) service, an ultra-reliable and low-latency communications (URLLC) service, and a massive machine type communications (mMTC) service.

Typical URLLC services include: wireless control in an industrial manufacturing or production procedure, motion control of a driverless car and a drone, and a tactile interaction type application such as a remote surgery. Main characteristics of these services are ultra reliability, a low latency, a relatively small transmission data amount, and unexpectedness.

The URLLC services have a very high requirement on a latency, and require a transmission latency to be not greater than 0.5 millisecond (ms) when reliability is not considered; and require the transmission latency to be not greater than 1 ms when 99.999% reliability is reached.

Therefore, a feedback information sending method and a feedback information receiving method are urgently needed, to satisfy a requirement of a service for high reliability.

SUMMARY

This application provides a signal transmission method, to improve service transmission reliability.

According to a first aspect, a feedback information sending method is provided, and includes: receiving, by a terminal device, on a first time unit, a first reference signal sent by a network device, where the first reference signal corresponds to first downlink control information, and the first downlink control information is used to schedule a first information block; determining, by the terminal device based on the first reference signal, that receiving of the first downlink control information in the first time unit fails; and sending, by the terminal device, on a first resource corresponding to the first time unit, first feedback information to the network device, where the first feedback information indicates that the receiving of the first downlink control information fails.

According to the method provided in embodiments of this application, the feedback information indicating that the receiving of the downlink control information fails is sent to the network device, to help the network device adjust, based on the feedback information, transmit power, an aggregation level, or the like for sending downlink control information to the terminal device next time, thereby helping to improve service transmission reliability.

In addition, the terminal device determines, based on the first reference signal sent by the network device, that the network device has sent the downlink control information. When receiving the first reference signal for a plurality of times, but not receiving the downlink control information sent by the network device, the terminal device may merge candidate downlink control channels that may carry the downlink control information, thereby improving the service transmission reliability.

With reference to the first aspect, in a first possible implementation of the first aspect, the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; a third status of the at least two information bits is used to indicate third feedback information, the third feedback information is used to indicate that the terminal device correctly decodes the first information block received in a time unit m−s, the first time unit is a time unit m, m and s are positive integers, and m is greater than or equal to s; and the sending, by the terminal device, first feedback information includes: sending, by the terminal device, on the first resource, the first status.

It should be understood that, the first reference signal is a reference signal used for control channel demodulation in the first time unit, and the second reference signal is a reference signal used for data channel demodulation in the first time unit. When a reference signal on a data channel and a reference signal on a control channel may be shared, the first reference signal and the second reference signal are the same.

With reference to the first aspect and the foregoing implementations of the first aspect, in a second possible implementation of the first aspect, the method further includes: sending, by the terminal device, on the first resource corresponding to a second time unit, the third status, where the second time unit is a time unit n, the third status indicates that the terminal device correctly decodes the first information block received in a time unit n−k, n and k are positive integers, and n is greater than or equal to k; or sending, by the terminal device, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

Therefore, for each time unit, the embodiments of this application provide a resource reuse method. A plurality of pieces of feedback information are sent on one first resource, and resource overheads are relatively small.

Specifically, if the terminal device correctly decodes, on an $n^{th}$ time unit, the first information block received on the time unit n−k, when the terminal device needs to feed back the third feedback information, the terminal device feeds back, on a first resource corresponding to the $n^{th}$ time unit, the third feedback information; when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, if the terminal device receives the first reference signal sent by the network device but does not receive the downlink control information sent by the network device, the terminal device sends, on the first resource corresponding to the $n^{th}$ time unit, the first feedback information; or when the terminal device does not need to feed back, on the $n^{th}$ time unit, the third feedback information, if the terminal device receives the downlink control information sent by the network device, the terminal device sends, on the first resource corresponding to the $n^{th}$ time unit, the second feedback information based on the received second reference signal.

With reference to the first aspect and the foregoing implementations of the first aspect, in a third possible implementation of the first aspect, a second resource corresponding to the first time unit is used to send at least two information bits, the second status of the at least two information bits is used to indicate second feedback information, the second feedback information is used to indicate a transmission parameter adjustment value, and the transmission parameter adjustment value is determined by the terminal device based on a second reference signal received in the first time unit; a third status of the at least two information bits is used to indicate third feedback information, the third feedback information is used to indicate that the terminal device correctly decodes the first information block received in a time unit m−s, the first time unit is a time unit m, m and s are positive integers, and m is greater than or equal to s; and the sending, by the terminal device, first feedback information includes: sending, by the terminal device, on the first resource, the first status, where a first status of the at least two information bits is used to indicate the first feedback information.

In the third possible implementation of the first aspect, a first resource corresponding to each time unit is used to send the first feedback information, and a second resource corresponding to each time unit is used to send the second feedback information or the third feedback information. Specifically, if the terminal device correctly decodes, on an $n^{th}$ time unit, the first information block received on the time unit n−k, when the terminal device needs to feed back the third feedback information, the terminal device feeds back, on a second resource corresponding to the $n^{th}$ time unit, the third feedback information; when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, if the terminal device receives the first reference signal sent by the network device but does not receive the downlink control information sent by the network device, the terminal device sends, on the first resource corresponding to the $n^{th}$ time unit, the first feedback information; or when the terminal device does not need to feed back, on the $n^{th}$ time unit, the third feedback information, if the terminal device receives the downlink control information sent by the network device, the terminal device sends, on the second resource corresponding to the $n^{th}$ time unit, the second feedback information based on the received second reference signal.

With reference to the first aspect and the foregoing implementations of the first aspect, in a fourth possible implementation of the first aspect, the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; and the sending, by the terminal device, first feedback information includes: sending, by the terminal device, on the first resource, the first status.

In other words, in this case, the terminal device may send, on the first resource corresponding to the first time unit, the first feedback information or the second feedback information; and the terminal device may send, on the second resource corresponding to the first time unit, the third feedback information.

The first resource may be a preset resource, or may be indicated by the network device to the terminal device by using higher layer signaling; and this is not limited in this application. Similarly, the second resource may be a preset resource, or may be indicated by the network device to the terminal device by using higher layer signaling; and this is not limited in this application.

With reference to the first aspect and the foregoing implementations of the first aspect, in a fifth possible implementation of the first aspect, the method further includes: sending, by the terminal device, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

In the fourth possible implementation and the fifth possible implementation of the first aspect, a first resource corresponding to each time unit is used to send the first feedback information or the second feedback information, and a second resource corresponding to each time unit is used to send the third feedback information. Specifically, if the terminal device correctly decodes, on an $n^{th}$ time unit, the first information block received on the time unit n−k, when the terminal device needs to feed back the third feedback information, the terminal device feeds back, on a second resource corresponding to the $n^{th}$ time unit, the third feedback information; when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, if the terminal device receives the first reference signal sent by the network device but does not receive the downlink control information sent by the network device, the terminal device sends, on the first resource corresponding to the $n^{th}$ time unit, the first feedback information; or when the terminal device does not need to feed back, on the $n^{th}$ time unit, the third feedback information, if the terminal device receives the downlink control information sent by the network device, the terminal device sends, on the first resource corresponding to the $n^{th}$ time unit, the second feedback information based on the received second reference signal. With reference to the first aspect and the foregoing implementations of the first aspect, in a sixth possible implementation of the first aspect, the first resource is used to send at least one information bit, and a first status of the at least one information bit is used to indicate the first feedback information; a third status of the at least one information bit is used to indicate third feedback information, the third feedback information is used to indicate that the terminal device correctly decodes the first information block received in a time unit m−s, the first time unit is a time unit m, m and s are positive integers, and m is greater than or equal to s; and the sending, by the terminal device, first feedback information includes: sending, by the terminal device, on the first resource, the first status.

With reference to the first aspect and the foregoing implementations of the first aspect, in a seventh possible implementation of the first aspect, the method further includes: sending, by the terminal device, on the first resource corresponding to a second time unit, the third status, where the second time unit is a time unit n, the third status indicates that the terminal device correctly decodes the first information block received in a time unit n−k, n and k are positive integers, and n is greater than or equal to k.

In the sixth possible implementation and the seventh possible implementation of the first aspect, a first resource corresponding to each time unit is used to send the first feedback information or the third feedback information, and a second resource corresponding to each time unit is used to send the second feedback information. Specifically, if the terminal device correctly decodes, on an $n^{th}$ time unit, the first information block received on the time unit n-k, when the terminal device needs to feed back the third feedback information, the terminal device feeds back, on a first resource corresponding to the $n^{th}$ time unit, the third feedback information; when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, if the terminal device receives the first reference signal sent by the network device but does not receive the downlink control information sent by the network device, the terminal device sends, on the first resource corresponding to the $n^{th}$ time unit, the first feedback information; or when the terminal device does not need to feed back, on the $n^{th}$ time unit, the third feedback information, if the terminal device receives the downlink control information sent by the network device, the terminal device sends, on the second resource corresponding to the $n^{th}$ time unit, the second feedback information based on the received second reference signal.

With reference to the first aspect and the foregoing implementations of the first aspect, in an eighth possible implementation of the first aspect, the method further includes: receiving, by the terminal device, indication information sent by the network device, where the indication information is used to indicate the first resource.

With reference to the first aspect and the foregoing implementations of the first aspect, in a ninth possible implementation of the first aspect, the method further includes: sending, by the terminal device, on the second resource corresponding to the first time unit, second feedback information, where the second feedback information is used to indicate a transmission parameter adjustment value, and the transmission parameter adjustment value is determined by the terminal device based on a second reference signal received in the first time unit; and sending, by the terminal device, on a third resource corresponding to the first time unit, the third feedback information, where the third feedback information is used to indicate that the terminal device correctly decodes the first information block received in a time unit m−s, the first time unit is a time unit m, m and s are positive integers, and m is greater than or equal to s.

In the ninth possible implementation of the first aspect, the first resource corresponding to each time unit is used to send the first feedback information, the second resource corresponding to each time unit is used to send the second feedback information, and a third resource corresponding to each time unit is used to send the third feedback information. Specifically, if the terminal device correctly decodes, on an $n^{th}$ time unit, the first information block received on the time unit n-k, when the terminal device needs to feed back the third feedback information, the terminal device feeds back, on a third resource corresponding to the $n^{th}$ time unit, the third feedback information; when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, if the terminal device receives the first reference signal sent by the network device but does not receive the downlink control information sent by the network device, the terminal device sends, on the first resource corresponding to the $n^{th}$ time unit, the first feedback information; or when the terminal device does not need to feed back, on the $n^{th}$ time unit, the third feedback information, if the terminal device receives the downlink control information sent by the network device, the terminal device sends, on the second resource corresponding to the $n^{th}$ time unit, the second feedback information based on the received second reference signal.

According to a second aspect, a feedback information receiving method is provided, and includes: sending, by a network device, on a first time unit, first reference signal to a terminal device, where the first reference signal corresponds to first downlink control information, and the first downlink control information is used to schedule a first information block; and receiving, by the network device, on a first resource corresponding to the first time unit, first feedback information sent by the terminal device, where the first feedback information indicates that receiving of the first downlink control information by the terminal device fails.

With reference to the second aspect, in a first possible implementation of the second aspect, the first resource is used to receive at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; a third status of the at least two information bits is used to indicate third feedback information, the third feedback information is used to indicate that the terminal device correctly decodes the first information block received in a time unit m−s, the first time unit is a time unit m, m and s are positive integers, and m is greater than or equal to s; and the receiving, by the network device, on a first resource corresponding to the first time unit, first feedback information sent by the terminal device includes: receiving, by the network device, on the first resource, the first status.

With reference to the second aspect, in a second possible implementation of the second aspect, the method further includes: receiving, by the network device, on the first resource corresponding to a second time unit, the third status, where the second time unit is a time unit n, the third status indicates that the terminal device correctly decodes the first information block received in a time unit n−k, n and k are positive integers, and n is greater than or equal to k; or receiving, by the network device, on the first resource corresponding to the second time unit, the second status, where the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

With reference to the second aspect, in a third possible implementation of the second aspect, when the network device receives, on the first resource corresponding to the second time unit, the second status, the method further includes: determining a transmission parameter in second downlink control information based on the transmission parameter adjustment value, where the second downlink control information is used to schedule the first information block.

With reference to the second aspect, in a fourth possible implementation of the second aspect, the method further includes: the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; the receiving, by the network device, first feedback information includes: receiving, by the network device, on the first resource, the first status.

With reference to the second aspect, in a fifth possible implementation of the second aspect, the method further includes: receiving, by the network device, on the first resource corresponding to the second time unit, the second status, where the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

With reference to the second aspect, in a sixth possible implementation of the second aspect, when the network device receives, on the first resource corresponding to the second time unit, the second status, the method further includes: determining a transmission parameter in second downlink control information based on the transmission parameter adjustment value, where the second downlink control information is used to schedule the first information block.

With reference to the second aspect, in a seventh possible implementation of the second aspect, the first resource is used to send at least one information bit, and a first status of the at least one information bit is used to indicate the first feedback information; a third status of the at least one information bit is used to indicate third feedback information, the third feedback information is used to indicate that the terminal device correctly decodes the first information block received in a time unit m−s, the first time unit is a time unit m, m and s are positive integers, and m is greater than or equal to s; and that the network device receives the first feedback information includes: receiving, by the network device, on the first resource, the first status.

With reference to the second aspect, in an eighth possible implementation of the second aspect, the method further includes: receiving, by the network device, on the first resource corresponding to a second time unit, the third status, where the second time unit is a time unit n, the third status indicates that the terminal device correctly decodes the first information block received in a time unit n−k, n and k are positive integers, and n is greater than or equal to k.

With reference to the second aspect, in a ninth possible implementation of the second aspect, when the network device receives the first feedback information, the method further includes: sending second downlink control information by using a second aggregation level, where the second aggregation level is higher than a first aggregation level, and sending, by the network device, the first downlink control information by using the first aggregation level, where the second downlink control information is used to schedule the first information block; and/or sending second downlink control information by using second transmit power, where the second transmit power is higher than first transmit power, and sending, by the network device, first downlink control information by using the first transmit power, where the second downlink control information is used to schedule the first information block.

With reference to the second aspect, in a tenth possible implementation of the second aspect, the method further includes: sending, by the network device, indication information to the terminal device, where the indication information is used to indicate the first resource.

According to a third aspect, a terminal device is provided, and is configured to perform the method according to the first aspect or any possible implementation of the first aspect. Specifically, the terminal device includes a unit configured to perform the method according to the first aspect or any possible implementation of the first aspect.

According to a fourth aspect, a network device is provided, and is configured to perform the method according to the second aspect or any possible implementation of the second aspect. Specifically, the terminal device includes a unit configured to perform the method according to the second aspect or any possible implementation of the second aspect.

According to a fifth aspect, a terminal device is provided, and includes a memory and a processor. The memory is configured to store a computer program. The processor is configured to invoke the computer program from the memory and run the computer program, so that a network device performs the foregoing method of the network device.

According to a sixth aspect, a network device is provided, and includes a memory and a processor. The memory is configured to store a computer program. The processor is configured to invoke the computer program from the memory and run the computer program, so that a terminal device performs the foregoing method of the terminal device.

According to a seventh aspect, a computer readable storage medium is provided. The computer readable storage medium stores an instruction. When being run on a computer, the instruction enables the computer to perform the method according to the foregoing aspects.

According to an eighth aspect, a computer program product including an instruction is provided. When being run on a computer, the computer program product enables the computer to perform the method according to the foregoing aspects.

DETAILED DESCRIPTION OF ILLUSTRATIVE EMBODIMENTS

Figure 1:
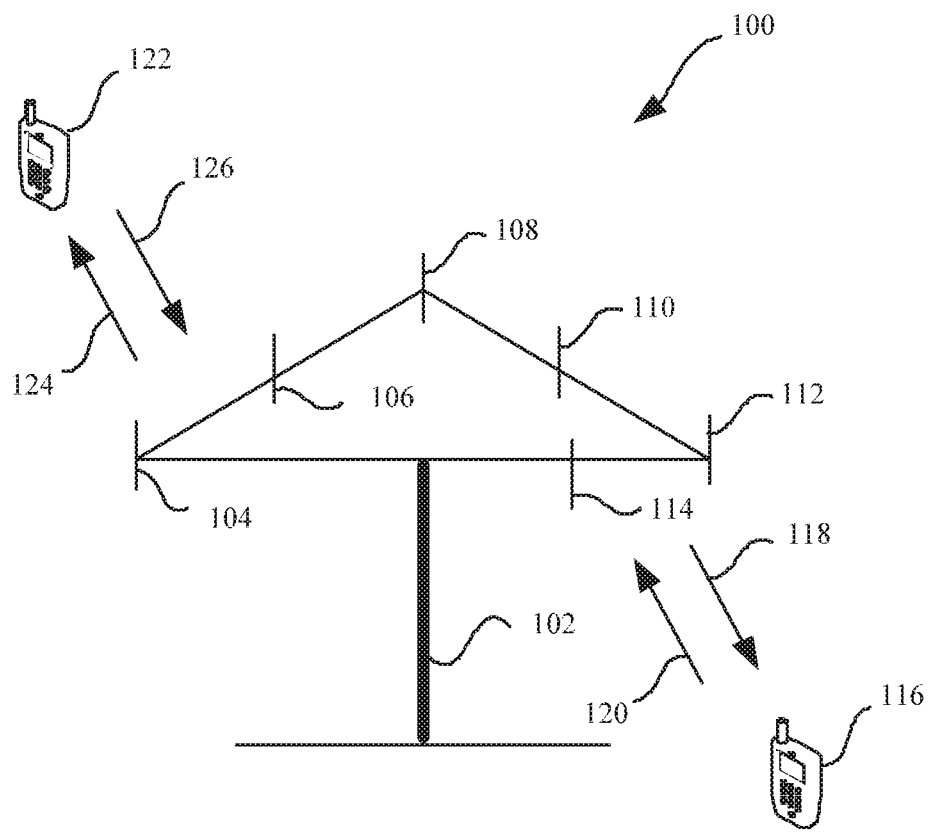
FIG. 1 is a schematic diagram of a wireless communication system applied to an embodiment of this application.

The following describes technical solutions of this application with reference to accompanying drawings.

It should be understood that, embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), or a next generation communication system, such as a 5G system.

Usually, a connection quantity supported by a conventional communication system is limited, and is easy to implement. However, with development of communication technologies, a mobile communication system not only supports conventional communication, but also supports device-to-device (D2D) communication, machine-to-machine (M2M) communication, machine type communication (MTC), vehicle to vehicle (V2V) communication, and the like.

In the embodiments of this application, the embodiments are described with reference to a sending device and a receiving device. The sending device may be one party of a network device and a terminal device, and the receiving device may be the other party of the network device and the terminal device. For example, in the embodiments of this application, the sending device may be the network device, and the receiving device may be the terminal device; or the sending device may be the terminal device, and the receiving device may be the network device.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, an in-vehicle device, a wearable device, and a next-generation communication system, for example, a terminal device in a fifth-generation (5G) communication network or a terminal device in a future evolved public land mobile network (PLMN) network.

For example, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. Generalized wearable intelligent devices include full-featured and large-size devices that can implement complete or partial functions without depending on smartphones, such as smartwatches or smartglasses, and devices that focus on only one type of application and need to work with other devices such as smartphones, such as various smart bands or smart jewelry for vital sign monitoring.

The network device may be a device configured to communicate with a mobile device. The network device may be an access point (AP) in a WLAN, or a base transceiver station (BTS) in GSM or CDMA, or may be a NodeB (NB) in WCDMA, or further may be an evolved Node B (eNB or eNodeB) in LTE, or a regeneration station or an access point, or an in-vehicle device, a wearable device, a network device in a future 5G network, a network device in a future evolved PLMN network, or the like.

In addition, in the embodiments of this application, the network device provides a service to a cell, and the terminal device communicates with the network device on a transmission resource (such as a frequency domain resource or a spectrum resource) used by the cell. The cell may be a cell corresponding to the network device (such as a base station). The cell may be served by a macro base station, or may be served by a base station corresponding to a small cell. Herein, the small cell may include: a metro cell, a micro cell, a pico cell, a femto cell, and the like. These small cells have characteristics of small coverage and low transmit power, and are applicable to provide a high-speed data transmission service.

The method and apparatus provided in the embodiments of this application may be applied to the terminal device or the network device. The terminal device or the network device includes a hardware layer, an operating system layer running on the hardware layer, and an application layer running on the operating system layer. The hardware layer includes hardware such as a central processing unit (CPU), a memory management unit (MMU), and a main memory (also referred to as a primary storage). The operating system may be any one or more types of computer operating systems, for example, a Linux operating system, a Unix operating system, an Android operating system, an iOS operating system, and a Windows operating system, that implement service processing through a process. The application layer includes applications such as a browser, an address book, word processing software, and instant messaging software. In addition, in the embodiments of this application, a specific structure of an execution entity of a signal transmission method is not specially limited in the embodiments of this application, provided that the execution entity can run a program that records code of the signal transmission method in the embodiments of this application, to perform communication based on the signal transmission method in the embodiments of this application. For example, an execution entity of a wireless communication method in the embodiments of this application may be the terminal device or the network device, or a functional module that are in the terminal device or the network device and that can invoke a program and execute the program.

In addition, aspects or features in the embodiments of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (PROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry an instruction and/or data.

In the current discussion, one consensus is that a mini-slot concept may be applied to a scenario of large bandwidth scheduling in a high frequency system, that is, a scheduling policy tilts towards a relatively small time granularity. However, for how to perform data scheduling based on a mini-slot, there is no determined solution. In addition, for how to listen on a downlink control channel based on the mini-slot, there is also no determined solution.

For the foregoing problems, the embodiments of this application provide a data sending method and a data receiving method, and a corresponding network device and terminal device.

FIG. 1 is a schematic diagram of a wireless communication system applied to an embodiment of this application. As shown in FIG. 1, the wireless communication system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, and an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or the terminal device 122. The terminal devices 116 and 122 may be, for example, a cellular phone, a smartphone, a portable computer, a handheld communication device, a handheld computing device, a satellite radio apparatus, a global positioning system, a PDA, and/or any other suitable devices used for communication in the wireless communication system 100.

As shown in FIG. 1, the terminal device 116 communicates with the antennas 112 and 114. The antennas 112 and 114 send information to the terminal device 116 over a forward link (also referred to as a downlink link) 118, and receive information from the terminal device 116 over a reverse link (also referred to as an uplink link) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system, a full duplex system, and a flexible duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the network device 102. For example, an antenna group may be designed to communicate with a terminal device in the sector within coverage of the network device 102. The network device may send, by using a single antenna or a plurality of antenna transmit diversities, a signal to all terminal devices in a sector corresponding to the network device. In a process in which the network device 102 communicates with the terminal devices 116 and 122 by using the forward links 118 and 124 respectively, a transmit antenna of the network device 102 may improve signal-to-noise ratios of the forward links 118 and 124 through beamforming. In addition, compared with a manner in which the network device sends a signal to all terminal devices served by the network device by using a single antenna or a plurality of antenna transmit diversities, when the network device 102 sends, through beamforming, a signal to the terminal devices 116 and 122 that are randomly distributed within related coverage, less interference is caused to a mobile device in a neighboring cell.

In a given time, the network device 102 and the terminal device 116 or the terminal device 122 may be a sending apparatus for wireless communication and/or a receiving apparatus for wireless communication. When sending data, the sending apparatus for wireless communication may encode the data for transmission. Specifically, the sending apparatus for wireless communication may obtain (for example, generate, receive from another communication apparatus, or store in a memory) a particular quantity of data bits to be sent, by using a channel, to the receiving apparatus for wireless communication. The data bit may be included in a transport block (or a plurality of transport blocks) of the data, and the transport block may be segmented to produce a plurality of code blocks.

In addition, the communication system 100 may be a PLMN network, a D2D network, an M2M network, or another network. FIG. 1 is only an example of a simplified schematic diagram, and a network may further include another network device that is not drawn in FIG. 1.

Figure 2:
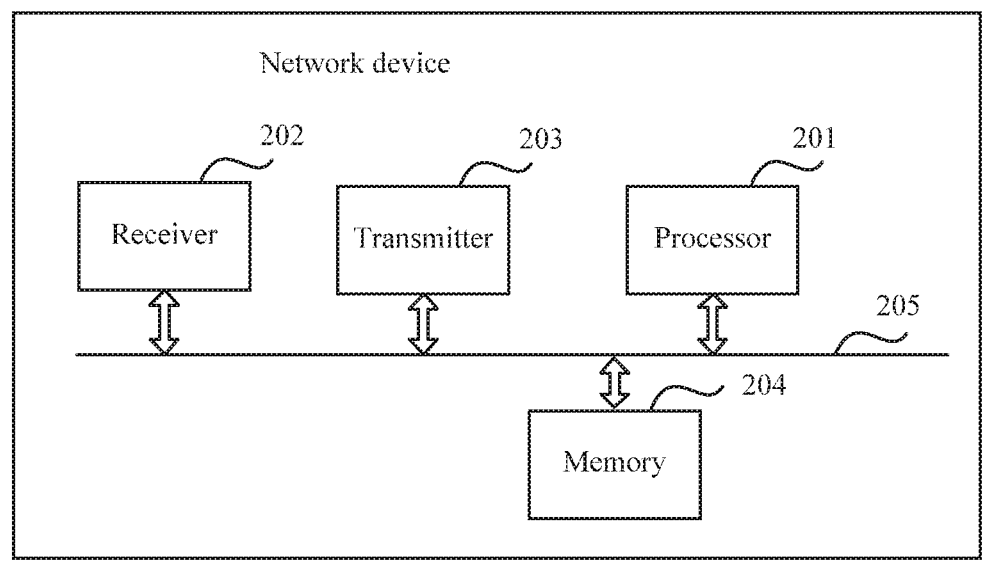
FIG. 2 is a schematic structural diagram of a network device in the wireless communication system shown in FIG. 1.

FIG. 2 is a schematic structural diagram of a network device in the foregoing wireless communication system. The network device can perform the data sending method provided in the embodiments of this application. The network device includes: a processor 201, a receiver 202, a transmitter 203, and a memory 204. The processor 201 may be in communication connection with the receiver 202 and the transmitter 203. The memory 204 may be configured to store program code and data of the network device. Therefore, the memory 204 may be a storage unit inside the processor 201, or may be an external storage unit independent from the processor 201, or may be a part that includes a storage unit inside the processor 201 and an external storage unit independent from the processor 201.

Optionally, the network device may further include a bus 205. The receiver 202, the transmitter 203, and the memory 204 may be connected to the processor 201 by using the bus 205. The bus 205 may be a peripheral component interconnect (PCI) bus, an extended industry standard architecture (EISA) bus, or the like. The bus 205 may be classified into an address bus, a data bus, a control bus, and the like. For ease of representation, only one thick line is used to represent the bus in FIG. 7, but this does not mean that there is only one bus or only one type of bus.

The processor 201 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor 201 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The receiver 202 and the transmitter 203 may be a circuit including the foregoing antenna, transmitter chain, and receiver chain. The two may be independent circuits, or may be a same circuit.

Figure 3:
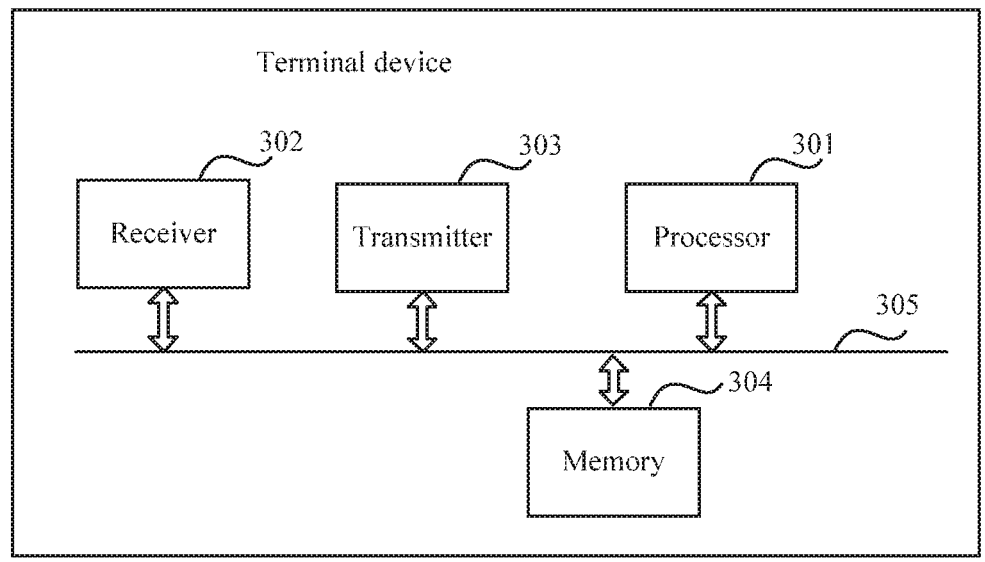
FIG. 3 is a schematic structural diagram of a network device in the wireless communication system shown in FIG. 1.

FIG. 3 is a schematic structural diagram of a terminal device in the foregoing wireless communication system. The terminal device can perform the data receiving method provided in the embodiments of this application. The terminal device may include: a processor 301, a receiver 302, a transmitter 303, and a memory 304. Optionally, the processor 301 may be in communication connection with the receiver 302 and the transmitter 303. Alternatively, the terminal device may further include a bus 305, and the receiver 302, the transmitter 303, and the memory 304 may be connected to the processor 301 by using the bus 305. The bus 305 may be a peripheral component interconnect (PCI) bus, an extended industry standard architecture (EISA) bus, or the like. The bus 305 may be classified into an address bus, a data bus, a control bus, and the like. For ease of representation, only one thick line is used to represent the bus in FIG. 3, but this does not mean that there is only one bus or only one type of bus.

Correspondingly, the memory 304 may be configured to store program code and data of the terminal device. Therefore, the memory 304 may be a storage unit inside the processor 301, or may be an external storage unit independent from the processor 301, or may be a part that includes a storage unit inside the processor 301 and an external storage unit independent from the processor 301. The receiver 302 and the transmitter 303 may be independent circuits, or may be a same circuit.

Figure 4:
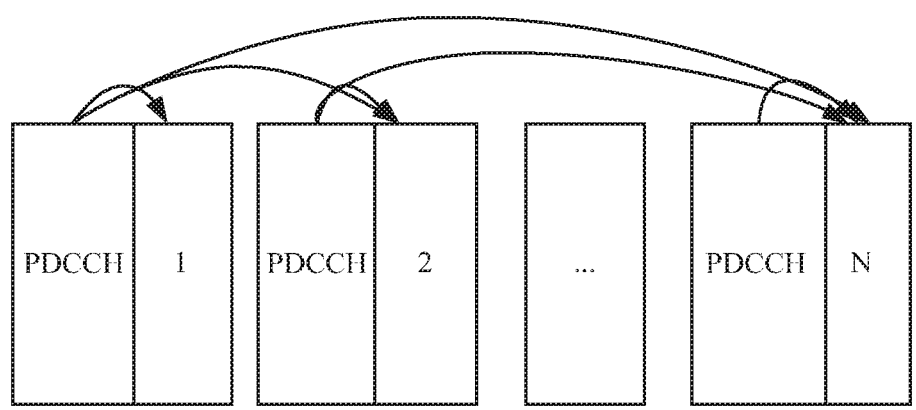
FIG. 4 is a schematic diagram of an application scenario according to an embodiment of this application.

To improve reliability of a URLLC service, a common method is to repeatedly send one information block for N times. In addition, to improve reliability of a control channel, a plurality of pieces of downlink control information may be sent. The plurality of pieces of downlink control information schedule N times of transmission of a same information block. N is an integer greater than 1. For example, FIG. 4 is a schematic diagram of an application scenario according to an embodiment of this application. As shown in FIG. 4, three pieces of downlink control information are separately sent, to schedule three times of transmission of a same information block. It should be understood that, FIG. 4 is only an example of a diagram of an application scenario, and this embodiment of this application is not limited thereto.

However, in an actual transmission process, there may be a case in which sending of one or more pieces of downlink control information fails. For example, if a requirement on the reliability of the URLLC service is 99.999%, in other words, a maximum block error rate is $10^{-5}$, a base station may satisfy the requirement on the reliability by scheduling three times of transmission, with a $10^{-2}$ block error rate for each time of transmission. If the first piece of downlink control information is lost, one time of transmission is lost, and data reliability can reach $1-(10^{-2})^2=99.99\%$, and cannot reach 99.999%. Once no downlink control information is received, the terminal device loses at least three chances of scheduling, and consequently transmission fails.

Therefore, when a plurality of pieces of downlink control information are sent to schedule a plurality of times of transmission of a same information block, how to further improve transmission reliability of the URLLC service becomes a problem needing to be resolved.

In this embodiment of this application, a time unit may include one or more time domain symbols, or may include one or more slots, or may include one or more mini-slots, or include one or more subframes. The time unit includes a plurality of time units, and the plurality of time units may be consecutive, or may be nonconsecutive. This is not limited in this application. The time domain symbols may be orthogonal frequency division multiplexing (OFDM) symbols, or may be single-carrier frequency division multiplexing (SC-FDM) symbols.

In this embodiment of this application, an information block may be a transport block (TB), a code block (CB), or a code block group (CBG). The CB includes a group of information bits. The group of information bits is used together for one time of channel coding, in other words, channel coding is performed by a sending device on the group of information bits together, corresponding to one bit block after the channel coding. The CBG includes at least one code block, and may include a plurality of code blocks. The TB includes at least one CB, or may include at least one CBG. This is not limited in this application.

Figure 5:
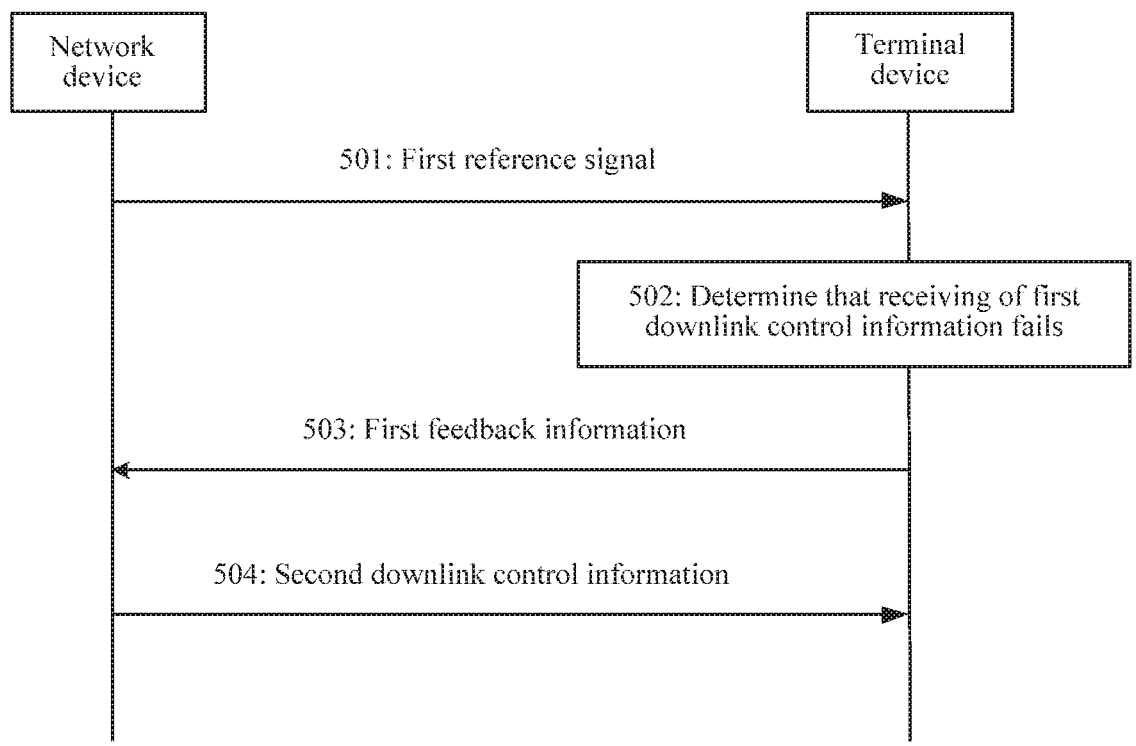
FIG. 5 is an interaction diagram for data transmission in a method according to an embodiment of this application.

The following specifically describes the method in the embodiments of this application. FIG. 5 is an interaction diagram for data transmission in a method according to an embodiment of this application. As shown in FIG. 5, the method includes the following steps. It should be noted that, a dashed line in FIG. 5 indicates that a corresponding step is an optional step.

Step 501: A network device sends, on a first time unit, a first reference signal to a terminal device, where the first reference signal corresponds to first downlink control information, and the first downlink control information is used to schedule a first information block. Correspondingly, the terminal device receives, in the first time unit, first reference signal sent by the network device.

Specifically, the first information block may be a transport block (TB) in a long term evolution (LTE) system. The first downlink control information is configured to schedule the first information block. The network device sends the first information block to the terminal device by using the first time unit. The first downlink control information may be downlink control information (DCI) in the LTE system.

The first downlink control information may be carried on the first downlink control channel. The first downlink control channel may be a physical downlink control channel (PDCCH) or another downlink channel used to carry physical layer control information. This is not limited in this application.

Further, the first downlink control channel further carries a first reference signal. Specifically, the first reference signal (RS) may be in the LTE system. Specifically, that the first reference signal corresponds to first downlink control information means that: the terminal device can demodulate and decode the first downlink control information based on the first reference signal.

Step 502: The terminal device determines, based on the first reference signal, that receiving of the first downlink control information in the first time unit fails.

Specifically, if the terminal device receives the first reference signal sent by the network device, the terminal device can determine that the network device sends, in the first time unit, the first downlink control information. However, if the terminal device does not receive the first downlink control information, or unsuccessfully demodulates and decodes the first downlink control information, the terminal device determines that the receiving of the first downlink control information fails.

Step 503: The terminal device sends, on a first resource corresponding to the first time unit, first feedback information to the network device, where the first feedback information indicates that the receiving of the first downlink control information fails.

Specifically, the first resource corresponding to the first time unit means that: the first resource has a determined time-frequency resource relationship with the first time unit. In other words, each time unit corresponds to one first resource used for sending uplink feedback information.

Specifically, the first feedback information may be feedback information that indicates that the receiving of the first downlink control information fails. In this embodiment of this application, for ease of description, feedback information indicating that receiving of downlink control information fails may be a PDCCH receiving failure. This is not limited in this application.

According to the method provided in embodiments of this application, the feedback information indicating that the receiving of the downlink control information fails is sent to the network device, to help the network device adjust, based on the feedback information, transmit power, an aggregation level, or the like for sending downlink control information to the terminal device next time, thereby helping to improve service transmission reliability.

In addition, the terminal device determines, based on the first reference signal sent by the network device, that the network device has sent the downlink control information. When receiving the first reference signal for a plurality of times, but not receiving the downlink control information sent by the network device, the terminal device may merge candidate downlink control channels that may carry the downlink control information, thereby improving the service transmission reliability.

Optionally, in an embodiment of this application, the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; a third status of the at least two information bits is used to indicate third feedback information, the third feedback information is used to indicate that the terminal device correctly decodes the first information block received in a time unit m−s, the first time unit is a time unit m, m and s are positive integers, and m is greater than or equal to s; and the sending, by the terminal device, first feedback information includes: sending, by the terminal device, on the first resource, the first status.

In other words, the first resource corresponding to the first time unit may be used for sending the at least two information bits, and different statuses of the two information bits may be used for indicating the foregoing three types of feedback information: the first feedback information, the second feedback information, and the third feedback information.

Specifically, the transmission parameter includes at least one of the following: at least one of a modulation method, an encoding mode, transmit power, and a beam setting.

It should be understood that, the first reference signal is a reference signal used for control channel demodulation in the first time unit, and the second reference signal is a reference signal used for data channel demodulation in the first time unit. When a reference signal on a data channel and a reference signal on a control channel may be shared, the first reference signal and the second reference signal are the same.

Specifically, the third feedback information is used for indicating that the terminal device correctly decodes the first information block received on the time unit m−s, in other words, the third feedback information may be an acknowledgement (acknowledgement) message of the first transmission.

Optionally, in an embodiment of this application, the method further includes: sending, by the terminal device, on the first resource corresponding to a second time unit, the third status, where the second time unit is a time unit n, the third status indicates that the terminal device correctly decodes the first information block received in a time unit n−k, n and k are positive integers, and n is greater than or equal to k; or sending, by the terminal device, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

In other words, in a case, if there is only one resource on which uplink information feedback is performed and that corresponds to a time unit (such as the time unit n), namely, the first resource, if the first information block received on the time unit n−k by the terminal device is correctly decoded, the third feedback information, namely, feedback information for feeding back that the first information block is correctly decoded, is sent on the first resource.

In other words, in another case, if there is only one resource on which uplink information feedback is performed and that corresponds to a time unit (such as the time unit n), namely, the first resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device successfully decodes, on the time unit n, the second downlink control information, the terminal device sends, on the first resource, the second feedback information. The second feedback information includes a transmission parameter adjustment value.

In other words, in another case, if there is only one resource on which uplink information feedback is performed and that corresponds to a time unit (such as the time unit n), namely, the first resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device receives the first reference signal sent by the network device but does not receive the downlink control information sent by the network device, the terminal device sends, on the first resource, the first feedback information.

Figure 6:
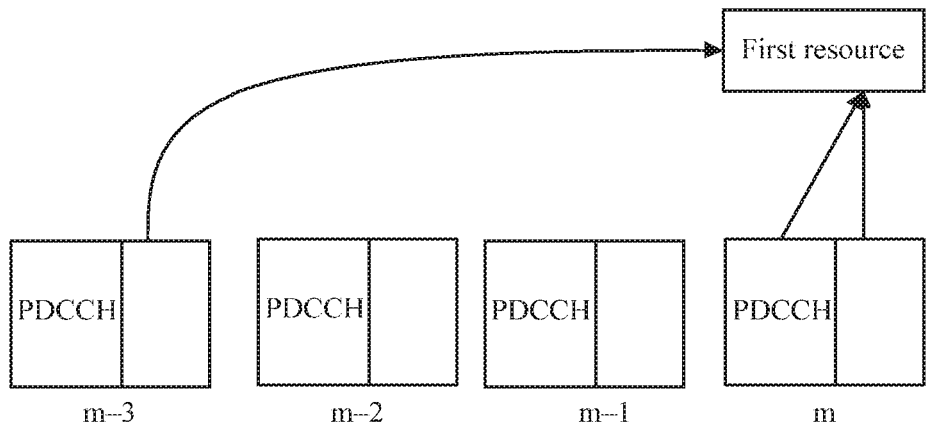
FIG. 6 is a schematic diagram of an embodiment of this application.

The following provides descriptions with reference to FIG. 6. FIG. 6 is a schematic diagram of an embodiment of this application. First feedback information is used to feed back that receiving of downlink control information on an $m^{th}$ time unit fails. Second feedback information is used to feed back a transmission parameter adjustment value. For example, the second feedback information may be used to feed back a modulation and coding scheme (MCS) adjustment value, and may be written as Delta_MCS for short. Third feedback information is used to feed back an ACK of a first information block sent on an $(m-3)^{th}$ time unit. Any one of the foregoing three types of feedback information may be fed back on a first resource corresponding to the $m^{th}$ time unit.

It should be understood that, the three time units that are used to transmit the first information block and that are shown in FIG. 6 are only examples. In an actual communication process, there may be more time units. Alternatively, in an actual communication process, at least one of the $(m-3)^{th}$ time unit, an $(m-2)^{th}$ time unit, or an $(m-1)^{th}$ time unit does not exist. This is not limited in this application.

Assuming that the first resource is used to send three information bits, different statuses of the three information bits may indicate different feedback information, as shown in Table 1.

TABLE 1

| First feedback information | Second feedback information | Third feedback information | Information bit |
|---|---|---|---|
| PDCCH receiving failure | None | None | 000 |
| None | Delt_MCS 1 | None | 001 |
| None | Delt_MCS 2 | None | 010 |
| None | Delt_MCS 3 | None | 011 |
| None | Delt_MCS 4 | None | 100 |
| Any status | Any status | ACK | 101 |

The six statuses of the three information bits shown in the last column in Table 1 respectively indicate the PDCCH receiving failure, Delt_MCS 1, Delt_MCS 2, Delt_MCS 3, Delt_MCS 4, and ACK.

Specifically, if a terminal device receives a first reference signal, and acknowledges a base station sends a PDCCH, but a user does not receive a PDCCH of the user, and in this case, the terminal device does not receive a first information block or demodulation and decoding of a first information block received by the terminal device fails, the terminal device feeds back a PDCCH receiving failure message to a network device. For example, as shown in Table 1, the terminal device feeds back "000" to the network device. In this case, the network device receives "000", and then the network device can determine that the feedback information is first feedback information, so that the network device sends, on a third time unit, second downlink control information based on the first feedback information. The second downlink control information is used to schedule the first information block. If a first time unit is m, the third time unit is m+p, where p is a positive integer.

Table 2 shows another manner of indicating uplink information feedback statuses.

TABLE 2

| First feedback information | Second feedback information | Third feedback information | Information bit |
|---|---|---|---|
| PDCCH receiving failure | None | None | 00 |
| None | Delt_MCS 1 | None | 0100 |
| None | Delt_MCS 2 | None | 0101 |
| None | Delt_MCS 3 | None | 0110 |
| None | Delt_MCS 4 | None | 0111 |
| Any status | Any status | ACK | 11 |

The two statuses of the two information bits shown in the last column in Table 2 respectively indicate the PDCCH receiving failure and ACK. The four statuses of the four information bits respectively indicate Delt_MCS 1, Delt_MCS 2, Delt_MCS 3, and Delt_MCS 4.

It should be understood that, Table 1 and Table 2 are only examples, and two or more information bits may be flexibly selected based on different transmission parameters, to indicate different feedback information. For example, when a transmission parameter has M values, the foregoing three types of feedback information may be indicated by using different statuses of at least $[\log_2 (M+2)]$ information bits. M is a positive integer. In addition, correspondences between each information bit status and the first feedback information, the second feedback information, and the third feedback information are only examples. For example, alternatively the PDCCH receiving failure may be indicated by using "11", and ACK may be indicated by using "00". This is not limited in this application.

Optionally, in an embodiment of this application, when the network device receives the first feedback information, the method further includes: Step 504: The network device sends second downlink control information by using a second aggregation level, where the second aggregation level is higher than a first aggregation level, and the network device sends the first downlink control information by using the first aggregation level, where the second downlink control information is used to schedule the first information block; and/or the network device sends second downlink control information by using second transmit power, where the second transmit power is higher than first transmit power, and the network device sends first downlink control information by using the first transmit power, where the second downlink control information is used to schedule the first information block.

In other words, based on the first feedback information returned by the terminal device, the network device can send, by using a higher aggregation level and/or higher transmit power, downlink control information for scheduling next transmission of the first information block, thereby helping to improve service transmission reliability.

Therefore, for each time unit, the embodiments of this application provide a resource reuse method. A plurality of pieces of feedback information are sent on one first resource, and resource overheads are relatively small.

Optionally, in an embodiment of this application, a second resource corresponding to the first time unit is used to send at least two information bits, a second status of the at least two information bits is used to indicate second feedback information, the second feedback information is used to indicate a transmission parameter adjustment value, and the transmission parameter adjustment value is determined by the terminal device based on a second reference signal received in the first time unit; a third status of the at least two information bits is used to indicate third feedback information, the third feedback information is used to indicate that the terminal device correctly decodes the first information block received in a time unit m−s, the first time unit is a time unit m, m and s are positive integers, and m is greater than or equal to s; and the sending, by the terminal device, first feedback information includes: sending, by the terminal device, on the first resource, the first status, where a first status of the at least two information bits is used to indicate the first feedback information.

In other words, the first resource corresponding to the first time unit is used to send the first feedback information, and the second resource corresponding to the first time unit is used to send the second feedback information or the third feedback information.

In other words, in a case, if there are two resources on which uplink information feedback is performed and that correspond to a time unit (such as the time unit n), namely, the first resource and the second resource, if the first information block received on the time unit n−k by the terminal device is correctly decoded, the third feedback information, namely, feedback information for feeding back that the first information block is correctly decoded, is sent on the second resource.

In other words, in another case, if there are two resources on which uplink information feedback is performed and that corresponds to a time unit (such as the time unit n), namely, the first resource and the second resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device successfully decodes, on the time unit n, the second downlink control information, the terminal device sends, on the second resource, the second feedback information. The second feedback information includes a transmission parameter adjustment value.

In other words, in another case, if there is only one resource on which uplink information feedback is performed and that corresponds to a time unit (such as the time unit n), namely, the first resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device receives the first reference signal sent by the network device but does not receive the downlink control information sent by the network device, the terminal device sends, on the first resource, the first feedback information.

The first resource of the first time unit may be a preset resource, or may be indicated by the network device to the terminal device by using higher layer signaling; and this is not limited in this application. Similarly, the second resource of the first time unit may be a preset resource, or may be indicated by the network device to the terminal device by using higher layer signaling; and this is not limited in this application.

Figure 7:
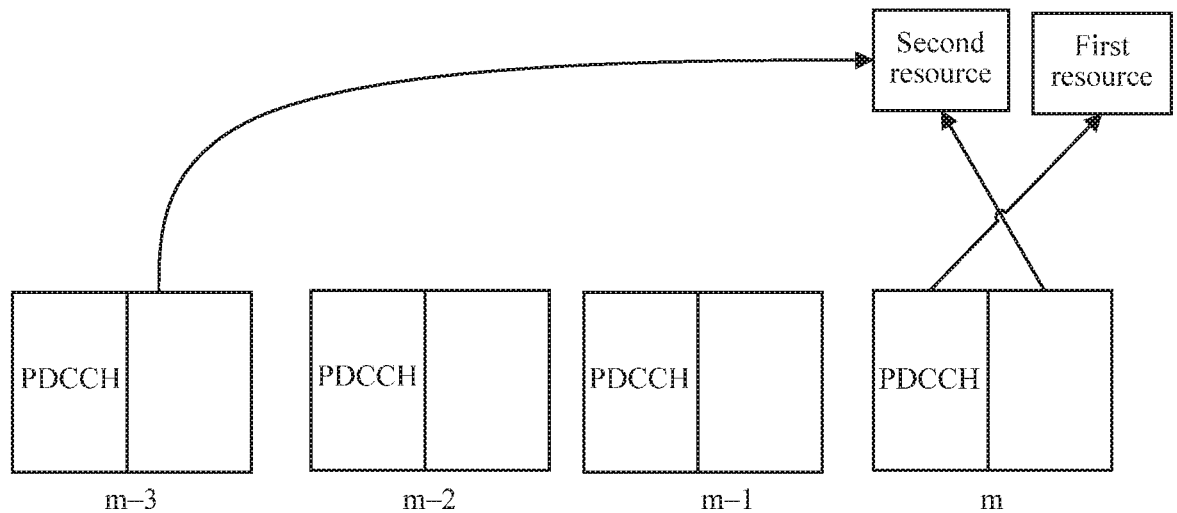
FIG. 7 is a schematic diagram of an embodiment of this application.

Descriptions are provided with reference to FIG. 7. FIG. 7 is a schematic diagram of an embodiment of this application. First feedback information is sent by using first resource information, and third feedback information and second feedback information are sent on a second resource. The second feedback information is sent by using second resource information, and the first feedback information and the second feedback information are sent on a first resource. The third feedback information may be information that is for acknowledging that a first information block is correctly decoded and that is sent on an $(m-3)^{th}$ time unit. The second feedback information may be a modulation and coding scheme adjustment value that is obtained based on a data reference signal on an $m^{th}$ time unit. The first feedback information may be information for acknowledging that receiving of downlink control information on the $m^{th}$ time unit fails, where m−3 is a positive integer.

It should be understood that, the three time units that are used to transmit the first information block and that are shown in FIG. 7 are only examples. In an actual communication process, there may be more time units. Alternatively, in an actual communication process, at least one of the $(m-3)^{th}$ time unit, an $(m-2)^{th}$ time unit, or an $(m-1)^{th}$ time unit does not exist. This is not limited in this application. Table 3 shows how the three types of feedback information are fed back when the first time unit corresponds to the first resource and the second resource.

TABLE 3

| First resource | | |
| --- | --- | --- |
| First feedback information | | Information bit |
| PDCCH receiving failure | | 1 |
| Second resource | | |
| Second feedback information | Second feedback information | Information bit |
| Delt_MCS 1 | None | 000 |
| Delt_MCS 2 | None | 001 |
| Delt_MCS 3 | None | 010 |
| Delt_MCS 4 | None | 011 |
| Any case | ACK | 110 |

In Table 3, the PDCCH receiving failure is indicated by using one information bit in the first resource, and the five statuses of the three information bits shown in the last column in the second resource respectively indicate ACK, Delt_MCS 1, Delt_MCS 2, Delt_MCS 3, and Delt_MCS 4.

It should be understood that, Table 3 is only an example, and for the second resource, the terminal device may flexibly select two or more information bits based on different transmission parameters, to indicate different feedback information. For example, corresponding to the second resource, when a transmission parameter has M values, the foregoing three types of feedback information may be indicated by using different statuses of at least $[\log_2(M+1)]$ information bits. M is a positive integer. In addition, correspondences between each information bit status and the first feedback information, the second feedback information, and the third feedback information are only examples. For example, alternatively the PDCCH receiving failure may be indicated by using "11", and ACK may be indicated by using "00". This is not limited in this application.

Optionally, in an embodiment of this application, the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; and the sending, by the terminal device, first feedback information includes: sending, by the terminal device, on the first resource, the first status.

Figure 8:
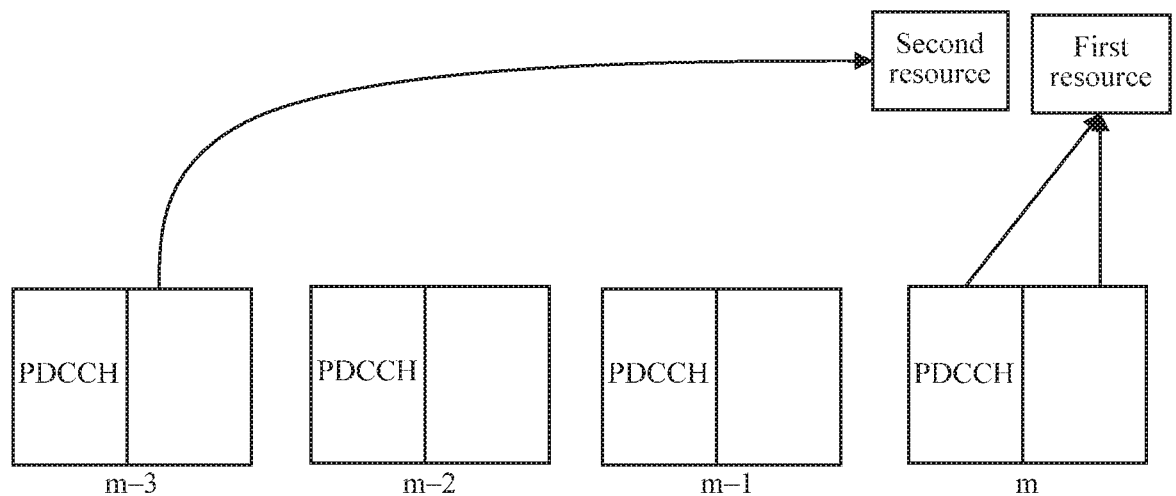
FIG. 8 is a schematic diagram of an embodiment of this application.

Descriptions are provided with reference to FIG. 8. FIG. 8 is a schematic diagram of an embodiment of this application. Third feedback information is sent by using second resource information, and first feedback information and second feedback information are sent on a first resource. The second feedback information is sent by using the second resource information, and the first feedback information and the second feedback information are sent on the first resource. The third feedback information may be information that is for acknowledging that a first information block is correctly decoded and that is sent on an $(m-3)^{th}$ time unit. The second feedback information may be a modulation and coding scheme adjustment value that is obtained based on a data reference signal on an $m^{th}$ time unit. The first feedback information may be information for acknowledging that receiving of downlink control information on the $m^{th}$ time unit fails, where m−3 is a positive integer.

It should be understood that, the three time units that are used to transmit the first information block and that are shown in FIG. 8 are only examples. In an actual communication process, there may be more time units. Alternatively, in an actual communication process, at least one of the $(m-3)^{th}$ time unit, an $(m-2)^{th}$ time unit, or an $(m-1)^{th}$ time unit does not exist. This is not limited in this application.

Table 4 shows how the three types of feedback information are fed back when the first time unit corresponds to the first resource and the second resource.

TABLE 4

| Second resource | | |
| --- | --- | --- |
| Third feedback information | | Information bit |
| ACK | | 1 |
| First resource | | |
| First feedback information | Second feedback information | Information bit |
| PDCCH receiving failure | None | 000 |
| None | Delt_MCS 1 | 001 |
| None | Delt_MCS 2 | 010 |
| None | Delt_MCS 3 | 011 |
| None | Delt_MCS 4 | 100 |

In Table 4, the third feedback information, such as ACK, is indicated by using one information bit in the first resource, and the five statuses of the three information bits shown in the last column in the second resource respectively indicate the PDCCH receiving failure, Delt_MCS 1, Delt_MCS 2, Delt_MCS 3, and Delt_MCS 4.

It should be understood that, Table 4 is only an example, and for the second resource, the terminal device may flexibly select two or more information bits based on different transmission parameters, to indicate different feedback information. For example, corresponding to the second resource, when a transmission parameter has M values, the foregoing three types of feedback information may be indicated by using different statuses of at least $[\log_2(M+1)]$ information bits. M is a positive integer. In addition, correspondences between each information bit status and the first feedback information, the second feedback information, and the third feedback information are only examples. For example, alternatively the PDCCH receiving failure may be indicated by using "11", and ACK may be indicated by using "00". This is not limited in this application.

Optionally, in an embodiment of this application, the method further includes: sending, by the terminal device, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n–k fails, the second time unit is a time unit n, n and k are positive integers, and n is greater than or equal to k.

In other words, in a case, if there are two resources on which uplink information feedback is performed and that correspond to a time unit (such as the time unit n), namely, the first resource and the second resource, if the first information block received on the time unit n–k by the terminal device is correctly decoded, the third feedback information, namely, feedback information for feeding back that the first information block is correctly decoded, is sent on the second resource.

In other words, in another case, if there are two resources on which uplink information feedback is performed and that corresponds to a time unit (such as the time unit n), namely, the first resource and the second resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device successfully decodes, on the time unit n, the second downlink control information, the terminal device sends, on the first resource, the second feedback information. The second feedback information includes a transmission parameter adjustment value.

In other words, in another case, if there is only one resource on which uplink information feedback is performed and that corresponds to a time unit (such as the time unit n), namely, the first resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device receives the first reference signal sent by the network device but does not receive the downlink control information sent by the network device, the terminal device sends, on the first resource, the first feedback information.

The third reference signal is a reference signal used for data channel demodulation on the second time unit.

Optionally, in an embodiment of this application, the first resource is used to send at least one information bit, and a first status of the at least one information bit is used to indicate the first feedback information; a third status of the at least one information bit is used to indicate third feedback information, the third feedback information is used to indicate that the terminal device correctly decodes the first information block received in a time unit m–s, the first time unit is a time unit m, m and s are positive integers, and m is greater than or equal to s; and the sending, by the terminal device, first feedback information includes: sending, by the terminal device, on the first resource, the first status.

It should be understood that, in this case, the terminal device sends, on the first resource, the first feedback information only when the third feedback information does not need to be sent on the first resource and the first feedback information needs to be sent on the first resource.

Figure 9:
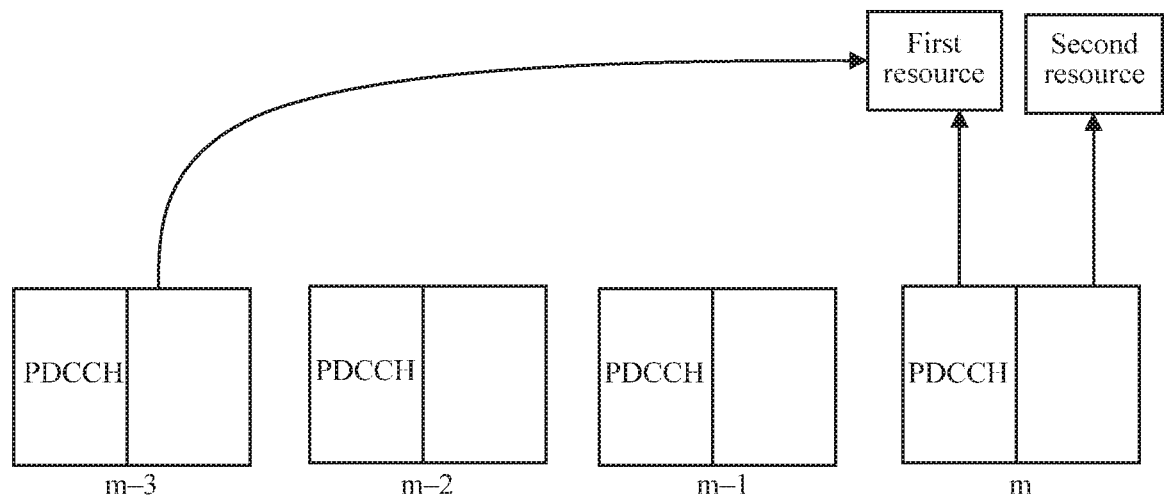
FIG. 9 is a schematic diagram of an embodiment of this application.

Descriptions are provided with reference to FIG. 9. FIG. 9 is a schematic diagram of an embodiment of this application. Second feedback information is sent by using second resource information, and first feedback information and second feedback information are sent on a first resource. The third feedback information may be information that is for acknowledging that a first information block is correctly decoded and that is sent on an $(m-3)^{th}$ time unit. The second feedback information may be a modulation and coding scheme adjustment value that is obtained based on a data reference signal on an $m^{th}$ time unit. The first feedback information may be information for acknowledging that receiving of downlink control information on the $m^{th}$ time unit fails, where m–3 is a positive integer.

It should be understood that, the three time units that are used to transmit the first information block and that are shown in FIG. 9 are only examples. In an actual communication process, there may be more time units. Alternatively, in an actual communication process, at least one of the $(m-3)^{th}$ time unit, an $(m-2)^{th}$ time unit, or an $(m-1)^{th}$ time unit does not exist. This is not limited in this application.

Table 5 shows how the three types of feedback information are fed back when the first time unit corresponds to the first resource and the second resource.

TABLE 5

| Second resource | |
| --- | --- |
| Second feedback information | Information bit |
| Delt_MCS 1 | 00 |
| Delt_MCS 2 | 01 |
| Delt_MCS 3 | 10 |
| Delt_MCS 4 | 11 |

| First resource | | |
| --- | --- | --- |
| First feedback information | Third feedback information | Information bit |
| PDCCH receiving failure | None | 0 |
| Any status | ACK | 1 |

In Table 5, the third feedback information, such as ACK, and the first feedback information, namely, the PDCCH receiving failure, are indicated by using one information bit in the first resource, and the two statuses of the three information bits shown in the last column in the second resource respectively indicate Delt_MCS 1, Delt_MCS 2, Delt_MCS 3, and Delt_MCS 4.

It should be understood that, Table 5 is only an example, and for the second resource, the terminal device may flexibly select two or more information bits based on different transmission parameters, to indicate different feedback information. For example, corresponding to the second resource, when a transmission parameter has M values, the foregoing three types of feedback information may be indicated by using different statuses of at least [$\log_2 M$] information bits. M is a positive integer. In addition, correspondences between each information bit status and the first feedback information, the second feedback information, and the third feedback information are only examples. For example, alternatively the PDCCH receiving failure may be indicated by using "11", and ACK may be indicated by using "00". This is not limited in this application.

Optionally, in an embodiment of this application, the method further includes: sending, by the terminal device, on the first resource corresponding to a second time unit, the third status, where the second time unit is a time unit n, the third status indicates that the terminal device correctly decodes the first information block received in a time unit n−k, n and k are positive integers, and n is greater than or equal to k.

In other words, in a case, if there are two resources on which uplink information feedback is performed and that correspond to a time unit (such as the time unit n), namely, the first resource and the second resource, if the first information block received on the time unit n−k by the terminal device is correctly decoded, the third feedback information, namely, feedback information for feeding back that the first information block is correctly decoded, is sent on the first resource.

In other words, in another case, if there are two resources on which uplink information feedback is performed and that corresponds to a time unit (such as the time unit n), namely, the first resource and the second resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device successfully decodes, on the time unit n, the second downlink control information, the terminal device sends, on the second resource, the second feedback information. The second feedback information includes a transmission parameter adjustment value.

In other words, in another case, if there is only one resource on which uplink information feedback is performed and that corresponds to a time unit (such as the time unit n), namely, the first resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device receives the first reference signal sent by the network device but does not receive the downlink control information sent by the network device, the terminal device sends, on the first resource, the first feedback information.

Optionally, in an embodiment of this application, the method further includes: sending, by the terminal device, on the second resource corresponding to the first time unit, second feedback information, where the second feedback information is used to indicate a transmission parameter adjustment value, and the transmission parameter adjustment value is determined by the terminal device based on a second reference signal received in the first time unit; and sending, by the terminal device, on a third resource corresponding to the first time unit, the third feedback information, where the third feedback information is used to indicate that the terminal device correctly decodes the first information block received in a time unit m−s, the first time unit is a time unit m, m and s are positive integers, and m is greater than or equal to s.

In other words, in a case, if there are three resources on which uplink information feedback is performed and that correspond to a time unit (such as the time unit n), namely, the first resource and the second resource, if the first information block received on the time unit n−k by the terminal device is correctly decoded, the third feedback information, namely, feedback information for feeding back that the first information block is correctly decoded, is sent on the third resource.

In other words, in another case, if there are two resources on which uplink information feedback is performed and that corresponds to a time unit (such as the time unit n), namely, the first resource and the second resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device successfully decodes, on the time unit n, the second downlink control information, the terminal device sends, on the second resource, the second feedback information. The second feedback information includes a transmission parameter adjustment value.

In other words, in another case, if there is only one resource on which uplink information feedback is performed and that corresponds to a time unit (such as the time unit n), namely, the first resource, when the terminal device does not need to feed back, on the $n^{th}$ time unit, the third feedback information, in other words, when the first information block is not received before the $n^{th}$ time unit, or decoding of the first information block fails, or demodulation and decoding of the first information block are not ended, or demodulation and decoding of the first information block succeed but no third feedback information is generated, and when the terminal device receives the first reference signal sent by the network device but does not receive the downlink control information sent by the network device, the terminal device sends, on the first resource, the first feedback information.

It should be understood that, the first reference signal is a reference signal used for control channel demodulation in the first time unit, and the second reference signal is a reference signal used for data channel demodulation in the first time unit. When a reference signal on a data channel and a reference signal on a control channel may be shared, the first reference signal and the second reference signal are the same.

Table 6 shows how the three types of feedback information are fed back when the first time unit corresponds to the first resource, the second resource, and the third resource.

TABLE 6

| First resource | |
| --- | --- |
| First feedback information | Information bit |
| PDCCH receiving failure | 1 |

| Second resource | |
| --- | --- |
| Second feedback information | Information bit |
| Delt_MCS 1 | 00 |
| Delt_MCS 2 | 01 |
| Delt_MCS 3 | 10 |
| Delt_MCS 4 | 11 |

| Third resource | |
| --- | --- |
| Third feedback information | Information bit |
| ACK | 1 |

In Table 6, the first feedback information, namely, the PDCCH receiving failure, is indicated by using one information bit in the first resource, the two statuses of the three information bits shown in the last column in the second resource respectively indicate Delt_MCS 1, Delt_MCS 2, Delt_MCS 3, and Delt_MCS 4, and the third feedback information is indicated by using one information bit in the third resource.

It should be understood that, Table 6 is only an example, and for the second resource, the terminal device may flexibly select two or more information bits based on different transmission parameters, to indicate different feedback information. For example, corresponding to the second resource, when a transmission parameter has M values, the foregoing three types of feedback information may be indicated by using different statuses of at least [$\log_2$ M] information bits. M is a positive integer. In addition, correspondences between each information bit status and the first feedback information, the second feedback information, and the third feedback information are only examples. For example, alternatively the PDCCH receiving failure may be indicated by using "11", and ACK may be indicated by using "00". This is not limited in this application.

Optionally, in an embodiment of this application, the foregoing method further includes: sending, by the network device, indication information to the terminal device, where the indication information is used to indicate the first resource. It should be understood that, each time unit corresponds to one first resource, and the indication information is used to indicate one or more first resources configured by the network device. It should be further understood that, the first resource may be a pre-configured resource. This is not limited in this application.

It should be further understood that, FIG. 5 is a schematic flowchart of a method according to an embodiment of this application. It should be understood that, FIG. 5 shows detailed communication steps or operations of the method, but these steps or operations are only an example. In embodiments of the present invention, another operation or variants of the various steps in FIG. 5 may be further performed. In addition, the steps in FIG. 5 may be separately performed in a sequence different from that presented in FIG. 4, and not all operations in FIG. 5 need to be performed.

It should be further understood that, in this embodiment of this application, "first", "second", and "third" are used only to distinguish between different objects, for example, distinguish between different time units, different resources, or the like, and should not constitute any limitation to this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

Figure 10:
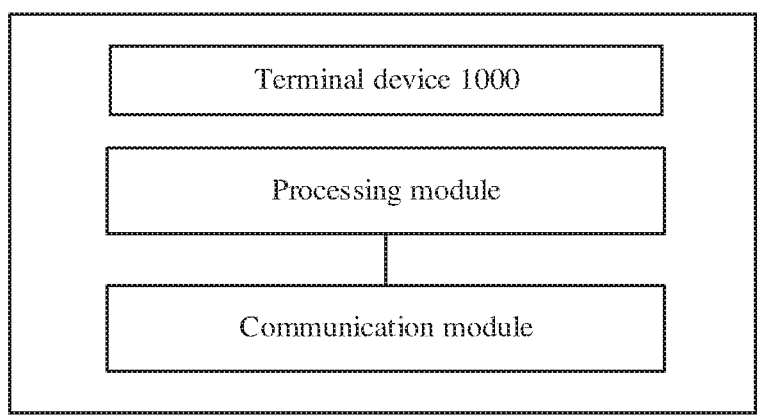
FIG. 10 is a schematic block diagram of a terminal device according to an embodiment of this application.

FIG. 10 is a schematic block diagram of a terminal device 1000 according to an embodiment of this application. Modules in the terminal device 1000 are separately configured to perform actions or processing processes performed by the terminal device in the foregoing method. Herein, to avoid a repeated description, refer to the descriptions in the foregoing for detailed descriptions.

The terminal device includes a communication module and a processing module. The communication module is configured to receive, on a first time unit, a first reference signal sent by a network device, where the first reference signal corresponds to first downlink control information, and the first downlink control information is used to schedule a first information block. The processing module is configured to determine, based on the first reference signal, that receiving of the first downlink control information in the first time unit fails. The communication module is further configured to send, on a first resource corresponding to the first time unit, first feedback information to the network device. The first feedback information indicates that the receiving of the first downlink control information fails.

Optionally, in an embodiment of this application, the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; a third status of the at least two information bits is used to indicate third feedback information, the third feedback information is used to indicate that the terminal device correctly decodes the first information block received in a time unit m−s, the first time unit is a time unit m, m and s are positive integers, and m is greater than or equal to s; and the communication module is specifically configured to send, on the first resource, the first status.

Optionally, in an embodiment of this application, the communication module is further configured to: send, on the first resource corresponding to a second time unit, the third status, where the second time unit is a time unit n, the third status indicates that the terminal device correctly decodes the first information block received in a time unit n−k, n and k are positive integers, and n is greater than or equal to k; or send, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

Optionally, in an embodiment of this application, the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; and the communication module is specifically configured to send, on the first resource, the first status.

Optionally, in an embodiment of this application, the communication module is further configured to: send, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

Optionally, in an embodiment of this application, the first resource is used to send at least one information bit, and a first status of the at least one information bit is used to indicate the first feedback information; a third status of the at least one information bit is used to indicate third feedback information, the third feedback information is used to indicate that the terminal device correctly decodes the first information block received in a time unit m−s, the first time unit is a time unit m, m and s are positive integers, and m is greater than or equal to s; and the communication module specifically configured to send, on the first resource, the first status.

Optionally, in an embodiment of this application, the communication module is further configured to send, on the first resource corresponding to a second time unit, the third status, where the second time unit is a time unit n, the third status indicates that the terminal device correctly decodes the first information block received in a time unit n−k, n and k are positive integers, and n is greater than or equal to k.

Optionally, in an embodiment of this application, the communication module is specifically further configured to receive indication information sent by the network device, where the indication information is used to indicate a first resource corresponding to the first time unit; and/or the indication information is used to indicate a first resource corresponding to the second time unit.

It should be noted that, the processing module in this embodiment may be implemented by using the processor 301 in FIG. 3, and the communication module in this embodiment may be implemented by using the receiver 302 and the transmitter 303 in FIG. 4.

For a technical effect that can be achieved in this embodiment, refer to the descriptions in the foregoing. Details are not described herein again.

Figure 11:
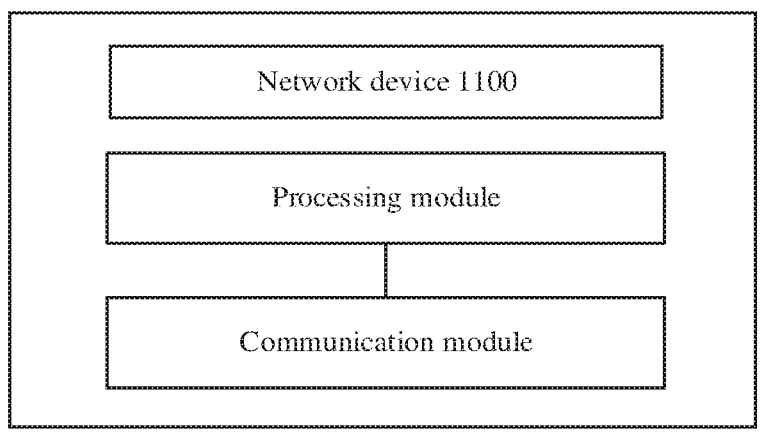
FIG. 11 is a schematic block diagram of a network device according to an embodiment of this application.

FIG. 11 is a schematic block diagram of a network device 1100 according to an embodiment of this application. Modules in the network device 1100 are separately configured to perform actions or processing processes performed by the network device in the foregoing method. Herein, to avoid a repeated description, refer to the descriptions in the foregoing for detailed descriptions.

The network device 1100 includes: a communication module and a processing module, where the processing module is configured to control the communication module to receive or send a signal; the communication module is configured to send, on a first time unit, first reference signal to a terminal device, where the first reference signal corresponds to first downlink control information, and the first downlink control information is used to schedule a first information block; and the communication module is further configured to receive, on a first resource corresponding to the first time unit, first feedback information sent by the terminal device, where the first feedback information indicates that receiving of the first downlink control information by the terminal device fails.

Optionally, in an embodiment of this application, the first resource is used to receive at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; a third status of the at least two information bits is used to indicate third feedback information, the third feedback information is used to indicate that the terminal device correctly decodes the first information block received in a time unit m−s, the first time unit is a time unit m, m and s are positive integers, and m is greater than or equal to s; and the communication module is specifically configured to receive, on the first resource, the first status.

Optionally, in an embodiment of this application, the communication module is further configured to: receive, on the first resource corresponding to a second time unit, the third status, where the second time unit is a time unit n, the third status indicates that the terminal device correctly decodes the first information block received in a time unit n−k, n and k are positive integers, and n is greater than or equal to k; or receive, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

Optionally, in an embodiment of this application, the first resource is used to send at least two information bits, and a first status of the at least two information bits is used to indicate the first feedback information; a second status of the at least two information bits is used to indicate second feedback information, the second feedback information is used to indicate a transmission parameter adjustment value, and the transmission parameter adjustment value is determined by the terminal device based on a second reference signal received in the first time unit; and the communication module is specifically configured to receive, on the first resource, the first status.

Optionally, in an embodiment of this application, the communication module is further configured to: receive, on the first resource corresponding to a second time unit, the second status when the terminal device successfully decodes, on the second time unit, second downlink control information, where the second downlink control information is used to schedule the first information block, the second status is used to indicate the transmission parameter adjustment value, the transmission parameter adjustment value is determined by the terminal device based on a third reference signal received on the second time unit, receiving of the first information block received on the time unit n−k fails, the second time unit is a time unit n, n and k are positive integers, and n is greater than or equal to k.

Optionally, in an embodiment of this application, the first resource is used to send at least one information bit, and a first status of the at least one information bit is used to indicate the first feedback information; a third status of the at least one information bit is used to indicate third feedback information, the third feedback information is used to indicate that the terminal device correctly decodes the first information block received in a time unit m−s, the first time unit is a time unit m, m and s are positive integers, and m is greater than or equal to s; and the communication module specifically configured to receive, on the first resource, the first status.

Optionally, in an embodiment of this application, the communication module is further configured to receive, on the first resource corresponding to a second time unit, the third status, where the second time unit is a time unit n, the third status indicates that the terminal device correctly decodes the first information block received in a time unit n−k, n and k are positive integers, and n is greater than or equal to k.

Optionally, in an embodiment of this application, when the network device receives the first feedback information, the communication module is further configured to: send second downlink control information by using a second aggregation level, where the second aggregation level is higher than a first aggregation level, and send the first downlink control information by using the first aggregation level, where the second downlink control information is used to schedule the first information block; or send second downlink control information by using second transmit power, where the second transmit power is higher than first transmit power, and send first downlink control information by using the first transmit power, where the second downlink control information is used to schedule the first information block.

Optionally, in an embodiment of this application, the communication module is further configured to send indication information to the terminal device, where the indication information is used to indicate a first resource corresponding to the first time unit; and/or the indication information is used to indicate a first resource corresponding to the second time unit.

It should be noted that, the processing module in this embodiment may be implemented by using the processor 201 in FIG. 2, and the communication module in this embodiment may be implemented by using the receiver 202 and the transmitter 203 in FIG. 2.

For a technical effect that can be achieved in this embodiment, refer to the descriptions in the foregoing. Details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, namely, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current system, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device in a first time unit, a first reference signal from a network device, wherein the first reference signal corresponds to first downlink control information, and the first downlink control information schedules a first information block;
   determining, by the terminal device in response to receiving the first reference signal and not receiving the first downlink control information in the first time unit, that receiving of the first downlink control information in the first time unit failed; and
   sending, by the terminal device, on a first resource corresponding to the first time unit, first feedback information to the network device, wherein the first feedback information indicates that the terminal device failed to receiving of the first downlink control information in the first time unit.

2. The method according to claim 1, wherein:
   information bits are sent on the first resource, and a first status of the information bits indicates the first feedback information;
   a second status of the information bits indicates second feedback information, the second feedback information indicates a transmission parameter adjustment value, and the transmission parameter adjustment value is determined by the terminal device according to a second reference signal received in the first time unit;
   a third status of the information bits indicates third feedback information, the third feedback information indicates that the terminal device correctly decoded the first information block received in a time unit m-s, the first time unit is a time unit m, m and s are positive integers, and m is greater than or equal to s; and
   sending, by the terminal device, the first feedback information comprises: sending, by the terminal device on the first resource, the information bits having the first status.

3. The method according to claim 2, wherein the method further comprises:
   sending, by the terminal device on a second resource corresponding to a second time unit, information bits having the third status, wherein the second time unit is a time unit n, the third status indicates that the terminal device correctly decoded the first information block received in a time unit n-k, n and k are positive integers, and n is greater than or equal to k; or
   sending, by the terminal device on the second resource corresponding to the second time unit, information bits having the second status when the terminal device successfully decodes, on the second time unit, second downlink control information, wherein the second downlink control information schedules the first information block, the second status indicates the transmission parameter adjustment value, the transmission parameter adjustment value is determined by the terminal device according to a third reference signal received on the second time unit, receiving of the first information block on the time unit n-k failed, the second time unit is a time unit n, n and k are positive integers, and n is greater than or equal to k.

4. The method according to claim 1, wherein:
   information bits are sent on the first resource, and a first status of the information bits indicates the first feedback information;
   a second status of the information bits indicates second feedback information, the second feedback information indicates a transmission parameter adjustment value, and the transmission parameter adjustment value is determined by the terminal device according to a second reference signal received in the first time unit; and
   sending, by the terminal device, the first feedback information comprises: sending, by the terminal device on the first resource, the information bits having the first status.

5. The method according to claim 4, wherein the method further comprises:
   sending, by the terminal device, on a second resource corresponding to a second time unit, information bits having the second status when the terminal device successfully decodes, on the second time unit, second downlink control information, wherein the second downlink control information schedules the first information block, the second status indicates the transmission parameter adjustment value, the transmission parameter adjustment value is determined by the terminal device according to a third reference signal received on the second time unit, receiving of the first information block on the time unit n-k failed, the second time unit is a time unit n, n and k are positive integers, and n is greater than or equal to k.

6. The method according to claim 1, wherein:
   an information bit is sent on the first resource, and a first status of the information bit indicates the first feedback information;
   a third status of the information bit indicates third feedback information, the third feedback information indicates that the terminal device correctly decoded the first information block received in a time unit m-s, the first time unit is a time unit m, m and s are positive integers, and m is greater than or equal to s; and
   sending, by the terminal device, the first feedback information comprises: sending, by the terminal device on the first resource, the information bit having the first status.

7. The method according to claim 6, wherein the method further comprises:
   sending, by the terminal device on a second resource corresponding to a second time unit, an information bit having the third status, wherein the second time unit is a time unit n, the third status indicates that the terminal device correctly decoded the first information block received in a time unit n-k, n and k are positive integers, and n is greater than or equal to k.

8. The method according to claim 1, wherein the method further comprises:
   receiving, by the terminal device, indication information sent by the network device, wherein the indication information corresponds to the first resource.

9. A method, comprising:
   sending, by a network device in a first time unit, a first reference signal to a terminal device, wherein the first reference signal corresponds to first downlink control information, and the first downlink control information schedules a first information block; and
   receiving, by the network device, on a first resource corresponding to the first time unit, first feedback information from the terminal device, wherein the first feedback information indicates that the terminal device failed to receive the first downlink control information in the first time unit, and wherein:

information bits are received on the first resource, and a first status of the information bits indicates the first feedback information;

a second status of the information bits indicates second feedback information, the second feedback information indicates a transmission parameter adjustment value, and the transmission parameter adjustment value is determined by the terminal device according to a second reference signal received in the first time unit;

a third status of the information bits indicates third feedback information, the third feedback information indicates that the terminal device correctly decoded the first information block received in a time unit m-s, the first time unit is a time unit m, m and s are positive integers, and m is greater than or equal to s; and receiving, by the network device on the first resource corresponding to the first time unit, the first feedback information sent by the terminal device comprises: receiving, by the network device on the first resource, the information bits having the first status.

10. The method according to claim 9, wherein the method further comprises:

receiving, by the network device, on a second resource corresponding to a second time unit, information bits having the third status, wherein the second time unit is a time unit n, the third status indicates that the terminal device correctly decoded the first information block received in a time unit n-k, n and k are positive integers, and n is greater than or equal to k; or receiving, by the network device, on the second resource corresponding to the second time unit, information bits having the second status, wherein the second status indicates the transmission parameter adjustment value, the transmission parameter adjustment value is determined by the terminal device according to a third reference signal received on the second time unit, receiving of the first information block on the time unit n-k failed, the second time unit is a time unit n, n and k are positive integers, and n is greater than or equal to k.

11. An apparatus, comprising:
at least one processor; and
a non-transitory computer-readable storage medium coupled to the at least one processor and storing programming instructions for execution by the at least one processor, wherein the programming instructions instruct the at least one processor to:
  receive, in a first time unit, a first reference signal sent by a network device, wherein the first reference signal corresponds to first downlink control information, and the first downlink control information is used to schedule a first information block;
  determine, in response to receiving the first reference signal and not receiving the first downlink control information in the first time unit, that receiving of the first downlink control information in the first time unit fails; and
  send, on a first resource corresponding to the first time unit, first feedback information to the network device, wherein the first feedback information indicates that the receiving of the first downlink control information fails.

12. The apparatus according to claim 11, wherein the first resource is used to send at least two information bits, and a first status of the at least two information bits is used to indicate the first feedback information;

a second status of the at least two information bits is used to indicate second feedback information, the second feedback information is used to indicate a transmission parameter adjustment value, and the transmission parameter adjustment value is determined by a terminal device according to a second reference signal received in the first time unit;

a third status of the at least two information bits is used to indicate third feedback information, the third feedback information is used to indicate that the terminal device correctly decodes the first information block received in a time unit m-s, the first time unit is a time unit m, m and s are positive integers, and m is greater than or equal to s; and the at least two information bits having the first status are sent on the first resource.

13. The apparatus according to claim 12, wherein the programming instructions instruct the at least one processor further to:

send, on a resource corresponding to a second time unit, information bits having the third status, wherein the second time unit is a time unit n, the third status indicates that the terminal device correctly decodes the first information block received in a time unit n-k, n and k are positive integers, and n is greater than or equal to k; or send, on the resource corresponding to a second time unit, information bits having the second status when the terminal device successfully decodes, on the second time unit, second downlink control information, wherein the second downlink control information is used to schedule the first information block, the second status is used to indicate the transmission parameter adjustment value, the transmission parameter adjustment value is determined by the terminal device according to a third reference signal received on the second time unit, receiving of the first information block received on the time unit n-k fails, the second time unit is a time unit n, n and k are positive integers, and n is greater than or equal to k.

14. The apparatus according to claim 11, wherein the first resource is used to send at least two information bits, and a first status of the at least two information bits is used to indicate the first feedback information;

a second status of the at least two information bits is used to indicate second feedback information, the second feedback information is used to indicate a transmission parameter adjustment value, and the transmission parameter adjustment value is determined by a terminal device according to a second reference signal received in the first time unit; and the at least two information bits having the first status are sent on the first resource.

15. The apparatus according to claim 14, wherein the programming instructions instruct the at least one processor further to:

send, on the first resource corresponding to a second time unit, information bits having the second status when the terminal device successfully decodes, on the second time unit, second downlink control information, wherein the second downlink control information is used to schedule the first information block, the second status is used to indicate the transmission parameter adjustment value, the transmission parameter adjustment value is determined by the terminal device according to a third reference signal received on the second time unit, receiving of the first information block received on the time unit n-k fails, the second time unit is a time unit n, n and k are positive integers, and n is greater than or equal to k.

16. The apparatus according to claim 11, wherein the first resource is used to send at least one information bit, and a first status of the at least one information bit is used to indicate the first feedback information;
- a third status of the at least one information bit is used to indicate third feedback information, the third feedback information is used to indicate that the terminal device correctly decodes the first information block received in a time unit m-s, the first time unit is a time unit m, m and s are positive integers, and m is greater than or equal to s; and
- the at least one information bit having the first status is sent on the first resource.

17. An apparatus, comprising:
- at least one processor; and
- a non-transitory computer-readable storage medium coupled to the at least one processor and storing programming instructions for execution by the at least one processor, wherein the programming instructions instruct the at least one processor to:
  - send, in a first time unit, first reference signal to a terminal device, wherein the first reference signal corresponds to first downlink control information, and the first downlink control information is used to schedule a first information block; and
  - receive, on a first resource corresponding to the first time unit, first feedback information sent by the terminal device, wherein the first feedback information indicates that receiving of the first downlink control information by the terminal device fails, and wherein:

the first resource is used to receive at least two information bits, and a first status of the at least two information bits is used to indicate the first feedback information;
- a second status of the at least two information bits is used to indicate second feedback information, the second feedback information is used to indicate a transmission parameter adjustment value, and the transmission parameter adjustment value is determined by the terminal device according to a second reference signal received in the first time unit;
- a third status of the at least two information bits is used to indicate third feedback information, the third feedback information is used to indicate that the terminal device correctly decodes the first information block received in a time unit m-s, the first time unit is a time unit m, m and s are positive integers, and m is greater than or equal to s; and
- the at least two information bits having the first status are sent on the first resource.

18. An The apparatus according to claim 17, wherein the first resource is used to send at least two information bits, and a first status of the at least two information bits is used to indicate the first feedback information;
- a second status of the at least two information bits is used to indicate second feedback information, the second feedback information is used to indicate a transmission parameter adjustment value, and the transmission parameter adjustment value is determined by the terminal device according to a second reference signal received in the first time unit; and
- the at least two information bits having the first status are sent on the first resource.

* * * * *